Sept 10, 1957     A. I. APPLETON     2,805,702
AUTOMOBILE SEAT AND CONTROL THEREFOR
Filed May 1, 1952
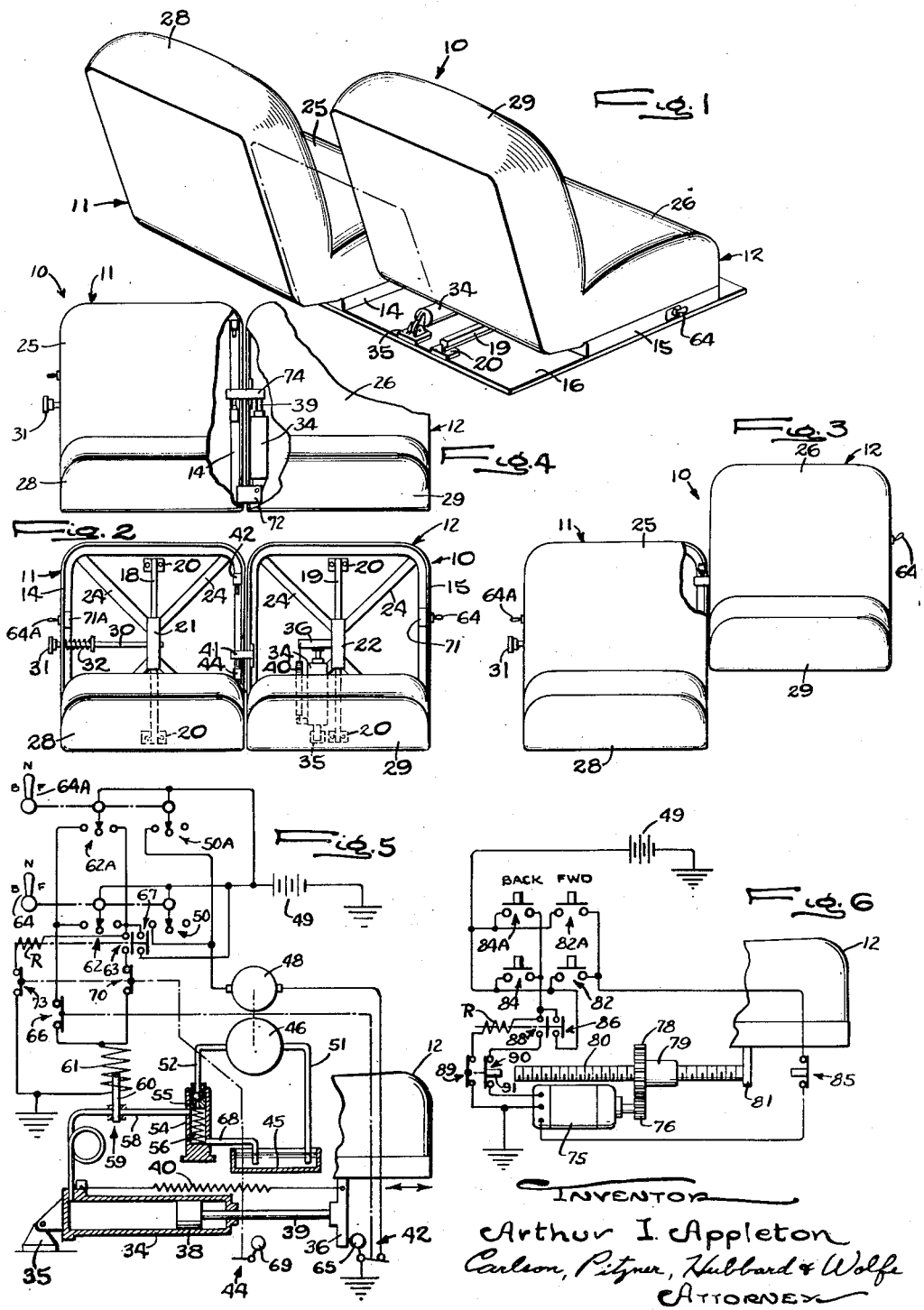

United States Patent Office 2,805,702
Patented Sept. 10, 1957

2,805,702

AUTOMOBILE SEAT AND CONTROL THEREFOR

Arthur I. Appleton, Northbrook, Ill.

Application May 1, 1952, Serial No. 285,385

3 Claims. (Cl. 155—15)

The present invention pertains generally to the field of automotive vehicles and more particularly to a novel automobile seat and control therefor. The invention is particularly, but not exclusively, useful in automobiles of the two-door type having both front and rear seats.

The general purpose of the invention is to provide an automobile seat having a section susceptible of being temporarily displaced in a fore-and-aft direction to afford greater access to the space behind the seat. The present invention represents an improvement over the invention disclosed and claimed in my copending application Serial No. 220,457, filed in the United States Patent Office on April 11, 1951, now U. S. Patent No. 2,660,223, issued November 24, 1953.

More specifically, it is an object of the invention to provide an automobile seat having a manually positionable section and a power-actuated section, the latter being temporarily displaceable in a fore-and-aft direction relative to the manually positionable section to render the space behind the seat more readily accessible.

A further object of the invention is to provide a double section automobile seat of the character set forth and wherein both sections are manually positionable and one section is power actuated, the former serving as a reference for establishing the normal position of the power-actuated section upon return of the latter from its temporary forward position.

Still another object of the invention is to provide an automobile seat of the foregoing type and wherein the power-actuated section will be susceptible of direct and easy control from either side of the automobile.

Other objects and advantages of the invention will become apparent as the following description proceeds, taken together with the accompanying drawings wherein:

Figure 1 is a diagrammatic perspective view of an illustrative automobile seat embodying the present invention and showing the power-actuated section in forwardly displaced position.

Fig. 2 is a plan view showing the illustrative seat of Fig. 1 with the two seat sections in alined position, the seat cushions being removed to facilitate illustration of the underlying parts.

Fig. 3 is a view similar to Fig. 2 but showing one of the seat sections in its temporarily displaced position.

Fig. 4 is a view also similar to Fig. 2 but showing a slight modification wherein one end of the power actuating means is anchored to the manually positionable section.

Fig. 5 is a diagrammatic view showing one form of power-actuating and control means particularly well adapted for use with the seat disclosed herein.

Fig. 6 shows a modified form of power-actuating and control means also well adapted for use with the seat disclosed herein.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claims.

Upon more specific reference to the drawing, it will be noted that the invention is there exemplified in a novel automobile seat 10 which is particularly well adapted for use in an automobile of the two-door type. In this instance, the seat 10 is centrally split and comprises a first section 11, which accommodates the driver of the automobile, and a second section 12, which accommodates at least one passenger. The sections 11, 12 include appropriate base frames 14 and 15, respectively, both being mounted for longitudinal sliding movement relative to a common underlying support such as floor 16 of the automobile body. This arrangement may, for example, include one or more guide rails 18, 19, each extending in a fore-and-aft direction and being rigidly fixed to the floor 16 as by means of mounting cleats 20. Slidably secured upon the rails 18, 19 are a pair of sliding shoes 21, 22, each fastened to a respective one of the base frames 14, 15 as by means of bracing 24. Where only a single guide rail is used under each seat section, as in the illustrated construction, each of the base frames may be provided with a moderate amount of outboard support such as rollers or casters (not shown). The base frames 14, 15 also carry seat cushions 25, 26 and back members 28, 29, respectively.

For the purpose of enabling the driver to locate the seat section 11 in a position suited to his individual requirements, the section 11 is provided with an appropriate adjustable positioning means. Such means may, for example, comprise a latching plunger 30 mounted transversely of the base frame 14 and terminating at its outer end in an actuating knob 31. The opposite end of the plunger 30 projects through the sliding shoe 21 and is adapted to register with selected ones of a series of alined holes or notches in the guide rail 18, securing the sliding shoe 21 at various predetermined points along the rail 18. A loading spring 32 surrounding the plunger 30 tends to maintain the same in registry with the holes or notches until the plunger is manually disengaged by an outward pull on knob 31. Since the shoe 21 is rigidly fixed to the base frame 14 and comprises an integral portion of the seat section 11, it will be appreciated that positioning of the shoe 21 at selected points along the guide rail 18 also serves to maintain the seat section 11 in corresponding selected positions.

Provision is made for temporarily displacing the passenger seat section 12 in a fore-and-aft direction so that it occupies a position considerably forward of the section 11 and thus affords greater access to the space behind the seat 10. This is accomplished by the use of power-actuated means such as an adjustable-length link connected to the section 12 and adapted to move the same relative to both the section 11 and to the floor 16 (see Figs. 1, 2 and 3). In the present instance, the power-actuated means comprises a hydraulic actuator 34 operatively interposed between an anchorage bracket 35 fixed to the floor 16 and an arm 36 rigid with the sliding shoe 22 of the seat section 12. The actuator 34 happens to be of the single acting type, comprising a piston 38 and piston rod 39 which are adapted to operate in opposition to a tensile loading spring 40 connected between the arm 36 and a point on the actuator housing. The forward and rearward extremities of the fore-and-aft movement of the seat section 12 are determined by a mechanical stop 41 and a pair of limit switches 42, 44. In this instance, the stop 41 is carried by the base frame 15 of the seat section 12 while the limit switches 42, 44 are fixed to the base frame 14 of the seat section 11.

Pressure fluid may be supplied to the hydraulic actuator 34 from a reservoir 45 by the use of a pump 46 driven as by means of an electric motor 48 (Fig. 5). The latter may conveniently be energized from the battery 49 of the automobile through either one of a pair of duplicate control switches 50, 50A, both preferably spring biased into an open position. When driven by the motor 48, the pump 46 draws fluid from the reservoir 45 into a suction conduit 51 and discharges such fluid into a pressure conduit 52 which conducts it to a spring loaded relief valve 54. Slidably mounted within the valve 54 is a sleeve element 55 which is adapted to move in a direction to compress its biasing spring 56 in response to the pressure of fluid admitted into the conduit 52. Such movement permits pressure fluid to flow from the conduit 52 into a second discharge conduit 58 which leads to the head end of the actuator 34. The conduit 58 may be flexible throughout a portion or all of its length and may include a loop to provide additional slack, as indicated in Fig. 5.

Admission of pressure fluid to the interior of the actuator 34, or exhausting of fluid therefrom, is governed by means of a solenoid control valve 59 having a movable plunger 60 which normally blocks the conduit 58 so as to preclude the flow of fluid therethrough. The valve 59 is equipped with an actuating solenoid 61 operated as by means of duplicate control switches 62, 62A, both being of the double throw type and being biased into an open position. Either of the switches 62, 62A is adapted to energize the solenoid 61 of the valve 59 from the battery 49. The control switches 62, 62A are mechanically connected for operation in unison with the control switches 50, 50A, respectively. Thus, the switch 62 has a common mechanical operator (shown schematically) with the switch 50, such operator in this instance terminating in a rockable handle 64 having forward and reverse positions and an intermediate or neutral position. By the same token, the switches 62A and 50A have a similar common operator terminating in a rockable handle 64A also having forward and reverse positions and an intermediate or neutral position. Since the switch operators 64, 64A and their associated switches are duplicates in both arrangement and operation, only the operator 64 and its associated switches need be referred to in the operational discussion below.

Assuming that the seat sections 11 and 12 are alined as indicated in Fig. 2, the section 12 may be given a forward displacement by rocking the handle 64 in a clockwise direction, as viewed in Fig. 5. This immediately closes a circuit energizing the pump motor 48 via the switch 50 and causes the pump 46 to deliver pressure fluid into the conduit 52. Such fluid forces the sleeve 55 of the valve 54 downwardly and establishes direct communication between the conduit 52 and the conduit 58.

At the same time, the solenoid 61 of the valve 59 becomes energized due to closing of the contacts of the switch 62, shifting the plunger 60 out of blocking engagement with the conduit 58 and permitting pressure fluid to flow into the head end of the actuator 34. Accordingly, the piston 38, piston rod 39, arm 36 and seat section 12 are shifted forwardly until the handle 64 is released and permitted to return to neutral position so as to open the contacts of the switches 50, 62. If, however, the handle 64 is maintained in its forward or clockwise position, the seat section 12, and the members 36, 38, 39 will continue to move forwardly until the arm 36 is accosted by the operator 65 of forward limit switch 42 carried by the seat section 11. Contact between the arm 36 and the member 65 serves to open the contacts of the limit switch 42 and de-energizes the pump motor 48, precluding further forward movement of the seat section 12. By reason of a mechanical connection (shown schematically in Fig. 5) between the limit switch operator 65 and a switch 66 connected in series with the closed contacts of the switch 62 and the control solenoid 61, the solenoid circuit also becomes de-energized upon de-energizing of the pump motor 48. Consequently, the seat section 12 becomes fixed in a position of maximum forward displacement.

In order to displace the seat section 12 rearwardly from a forward position to its normal position of lateral alinement with the seat section 11, it is merely necessary to rock the handle 64 momentarily in a counterclockwise direction as viewed in Fig. 5. This position of the contacts of the switch 50 leaves the pump motor 48 de-energized. However, the contacts of the switch 62 close momentarily and complete a circuit between the battery and control solenoid relay R, energizing the latter. The relay R thereupon closes normally open sealing-in contacts 63 and solenoid switch contacts 67. This energizes the control solenoid 61 and maintains the same in an energized condition, withdrawing the plunger 60 clear of the conduit 58 and permitting fluid to exhaust from the head end of the actuator 34 into the valve 54 and thence into the reservoir 45 via exhaust conduit 68. The tensile spring 40 provides the necessary force to exhaust fluid from the actuator 34 under these conditions and to move the seat section 12 rearwardly toward its normal position. Such rearward movement will continue until the seat section 12 has returned to its normal position wherein it is laterally alined with the companion section 11, and regardless of whether the handle 64 is released from or maintained in its counterclockwise position.

Upon arrival of the seat section 12 at its normal position corresponding to that of the companion section 11, the arm 36 is accosted by operator 69 of rear limit switch 44 carried by the seat section 11. The operator 69 of the rear limit switch has a direct mechanical connection (shown schematically) with a switch 70 connected in series with the closed contacts of the switch 62 and the solenoid 61. The operator 69 also has a direct mechanical connection with a switch 73 in series with the control solenoid relay R. As a result of contact between the arm 36 and the operator 69, the contacts of the switches 73, 70 open and de-energize the control solenoid relay R and the control solenoid 61, arresting further withdrawal of fluid from the actuator 34 and precisely locating the seat section 12 at its normal position. Such position could also be defined by a positive mechanical stop located, for example, within the actuator 34 itself.

For convenience in control and operation, the switches 50 and 62 may be consolidated into a single casing 71 and, together with the actuating handle 64, may be mounted on the seat section 12 where the handle 64 is readily accessible to a person on the passenger side of the automobile. By the same token, the duplicate switches 50A, 62A and their operating handle 64A, which duplicate the members 50, 62 and 64, may be assembled together into a single casing 71A and mounted on the seat section 11 for operation by the driver of the automobile.

The arrangement just described permits the seat section 11 to be adjusted manually by the driver but requires the use of the power actuating system associated with the seat section 12 to reorient the latter into a normal position corresponding with each new adjustment in the position of the driver's section 11. Consequently, in some instances it might be found expedient to permit the seat section 12 to be positioned in unison with the seat section 11 when the latter is manually adjusted. Referring to Fig. 4, it will be noted that this objective may readily be achieved by connecting the hydraulic actuator 34 directly between the seat sections 11 and 12. Accordingly, one end of the actuator 34 is provided with an anchorage 72 which is rigidly fixed to base frame 14 of the seat section 11. Piston rod 39 of the actuator 34 is connected directly to a modified arm 74 fixed to the base frame of the seat section 12 and having a portion overlying the base frame 14 of the seat section 11 to perform the function of the mechanical stop 41. Aside from these changes, the control system and switch arrangement are identical with that just described and the seat section 12 may be displaced and repositioned by the application of power in the manner already set forth above.

Turning now to Fig. 6, an alternative control system is there shown. This arrangement comprises a reversible electric motor 75 which may readily be anchored either to the floor 16 or to the seat section 11. The motor 75 may, for example, be equipped with a drive pinion 76 which engages a gear 78 fixed to a nut member 79. The member 79 is disposed in threaded engagement with a lead screw 80 having one end free and its opposite end connected to the base frame of the seat section 12 as by means of a depending arm 81.

The reversible motor 75 may be energized from the automobile battery 49 as by means of normally open control switches 82, 84 which may be located on the seat section 12, or by means of duplicate control switches 82A, 84A, which may be located on the seat section 11. Thus closure of the forward switch 82 or 82A will energize the motor 75 and cause it to rotate in the proper direction to move the lead screw 80, the arm 81 and the seat section 12 in a forward direction, the extreme forward position being defined by means of a forward limit switch 85 which is adapted to de-energize the motor 75 upon contact with the arm 81.

Momentary closure of the reverse switch 84 or 84A will energize a control relay R, closing normally open sealing-in contacts 86 and motor switch contacts 88. This will cause the motor 75 to rotate in the opposite direction, moving the lead screw 80, the arm 81 and the seat section 12 rearwardly. The rearward limit of movement, and also the normal position of the seat section 12, are defined by means of a double pole rear limit switch including contacts 89, 90 adapted to open and de-energize the relay R and the motor 75 upon contact between the limit switch operator 91 and the rearward end of the lead screw 80.

I claim as my invention:

1. An automobile seat slidable for longitudinal movement on tracks mounted on the floor of an automobile comprising first and second laterally adjacent companion seat sections, means for manually adjusting and locking the longitudinal position of the first section, coupling means on adjacent portions of said seat sections confining the relative movement of the second section from a position laterally alined with the adjusted position of said first seat section to a position ahead of it, and power-actuated means for moving said second section relative to the floor and the first section.

2. An automobile seat slidable for longitudinal movement on tracks mounted on the floor of an automobile comprising first and second laterally adjacent companion sections, means for manually adjusting and locking the longitudinal position of the first section, and power-actuated means for adjusting the second section from a position laterally alined with said first section to a position ahead of it, said power-actuated means controlled by the relative movement between limit switch means fastened to one of said sections and stop means fastened to the other.

3. An automobile seat slidable for longitudinal movement on tracks mounted on the floor of an automobile comprising first and second laterally adjacent companion sections, means for manually adjusting and locking the longitudinal position of the first section, and means for adjusting the position of the second section from a position laterally alined with said first section to a position ahead of it comprising a power-actuated adjustable-length link having opposite ends coupled to the respective sections.

References Cited in the file of this patent
UNITED STATES PATENTS

| | | |
|---|---|---|
| 1,087,003 | Engel | Feb. 10, 1914 |
| 1,636,078 | Schreiber | July 19, 1927 |
| 1,714,462 | De Veau | May 21, 1929 |
| 2,160,015 | Haberstump | May 30, 1939 |
| 2,283,761 | Richter | May 19, 1942 |
| 2,640,465 | McLeod | June 2, 1953 |
| 2,660,223 | Appleton | Nov. 24, 1953 |